CONNECTOR APPLYING TOOL

Original Filed May 15, 1961 4 Sheets-Sheet 1

INVENTOR.
HERBERT C. STOLTZ
BY
Lewis, Morris & Safford

CONNECTOR APPLYING TOOL

Original Filed May 15, 1961 4 Sheets-Sheet 2

INVENTOR.
HERBERT C. STOLTZ
BY
Curtis, Morris & Safford

Jan. 24, 1967 H. C. STOLTZ Re. 26,146

CONNECTOR APPLYING TOOL

4 Sheets-Sheet 3

Original Filed May 15, 1961

INVENTOR.
HERBERT C. STOLTZ
BY
Lewis, Morris & Safford

CONNECTOR APPLYING TOOL

Original Filed May 15, 1961 4 Sheets-Sheet 4

INVENTOR.
HERBERT C. STOLTZ
BY
Curtis, Morris & Safford

United States Patent Office

Re. 26,146
Reissued Jan. 24, 1967

26,146
CONNECTOR APPLYING TOOL

Herbert C. Stoltz, Hershey, Pa., assignor to
AMP Incorporated, Harrisburg, Pa.

Original No. 3,135,310, dated June 2, 1964, Ser. No. 110,234, May 15, 1961. Application for reissue June 23, 1965, Ser. No. 467,824
12 Claims. (Cl. 72—397)

Matter enclosed in heavy brackets [ ] appears in the original patent but forms no part of this reissue specification; matter printed in italics indicates the additions made by reissue.

This invention relates to tools for applying electrical connectors to the ends of conductors by radial indentation of the connector ferrule.

An object of the invention is to provide an improved connector applying tool of the radial indentation type. A further object is to provide an indenting type of tool having the indenting means thereof disposed in separable tool holders so that the connectors which are indented can be moved laterally to a position between the holders and can be moved from between the holders after indentation. A still further object is to provide an indentation type tool for electrical connectors which can be actuated by fluid or mechanical actuating means such as compressed air or an electric motor. A further object is to provide an indentation type crimping tool which can be adjusted for the accommodation of ferrules of varying sizes and for varying depths of indentation.

These and other objects of the invention are achieved in a preferred embodiment comprising a C-shaped frame having a first tool holder yieldingly mounted on one arm thereof and a movable tool holder mounted on a reciprocable ram for movement towards and away from the first tool holder. In each of these tool holders there are pivotally mounted a pair of indenters which are cammed into engagement with a terminal positioned between the tool holders upon relative movement of the tool holders as a unit. The movement of the indenters relative to the tool holders is achieved by camming means, one such camming means being provided on the reciprocable ram and the other such camming means being fixed on an arm of the C-shaped frame member. The arrangement is such that upon actuation of the ram and upon movement of the movable tool holder towards the other tool holder, the two tool holders first move into engagement with each other and then move as a unit toward the one arm of the frame. Thereafter, the indenters are cammed relatively towards a connector positioned between the tool holders to radially indent the connector and to crimp it onto the end of a wire.

Figure 3:
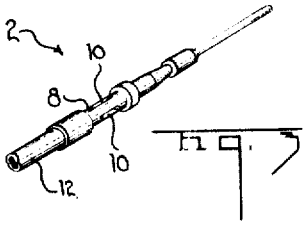
FIGURE 3 is a perspective view of an indented connector.
Figure 2:
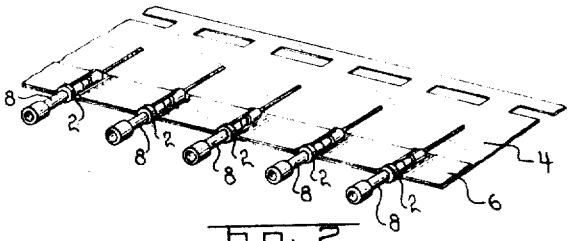
FIGURE 2 is a persepective view of a short section of belting having connectors mounted thereon at uniformly spaced intervals.

Referring first to FIGURES 2 and 3, the disclosed embodiment of the invention is particularly intended to indent terminals 2 which have cylindrical ferrule-portions 8 adapted to receive the stripped end of a conductor 12. Terminals of this type can be secured to a belt 4 in spaced-apart parallel relationship and held thereon by means of a separate strip 6 which is bonded to the belt 4. The tool disclosed in the description which follows has a mechanism for intermittently feeding this belting during each cycle of operation so as to position the leading terminal of the belting at a location between the tool holders. The belt advancing and supporting mechanism does not, however, constitute a part of the present invention and will not be described in detail. For purposes of the instant disclosure, it is sufficient to say that the belt of FIGURE 2 is advanced during each cycle of operation of the tool to position an uncrimped terminal between the tool holders described below. Reference is made to the copending application, Serial No. 805,433, filed April 10, 1959, by Martin L. Klingler et al., now Patent Number 3,037,545, for a complete description of this belt supporting and advancing mechanism.

Figure 4:
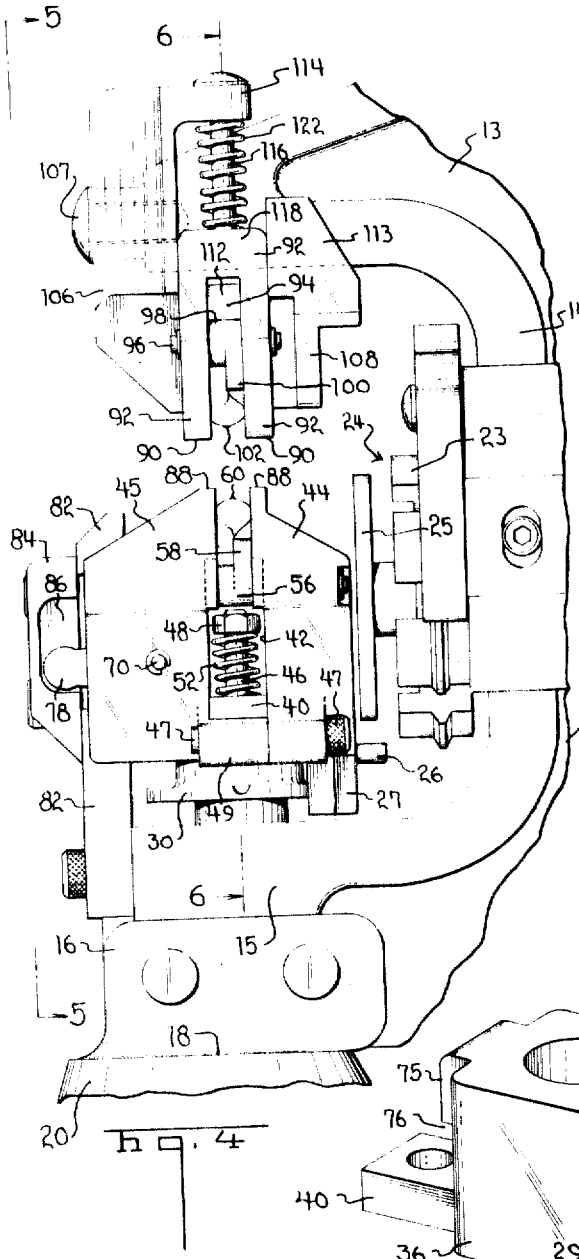
FIGURE 4 is a fragmentary side view of the preferred embodiment.

A preferred embodiment of the invention comprises a generally C-shaped tool frame 14 having a lower arm 15 which is received between, and secured to, ears 16. These ears are integral with a cylinder head 18 of a cylinder 20 which contains the actuating mechanism for a reciprocable ram 28 (FIGURE 4). Cylinder 20 may, for example, contain a simple fluid-operated piston for reciprocating the ram or alternatively it can contain a fluid-operated piston in combination with a mechanical linkage for reciprocating the ram as disclosed in the copending application of Marting L. Klingler, Serial No. 36,023, filed June 14, 1960, now Patent No. 3,053,112. In either event, it is advantageous to provide an actuating trigger 22 on the external surface of the cylinder 20 to permit the operator to both hold and actuate the tool with one hand.

Figure 1:
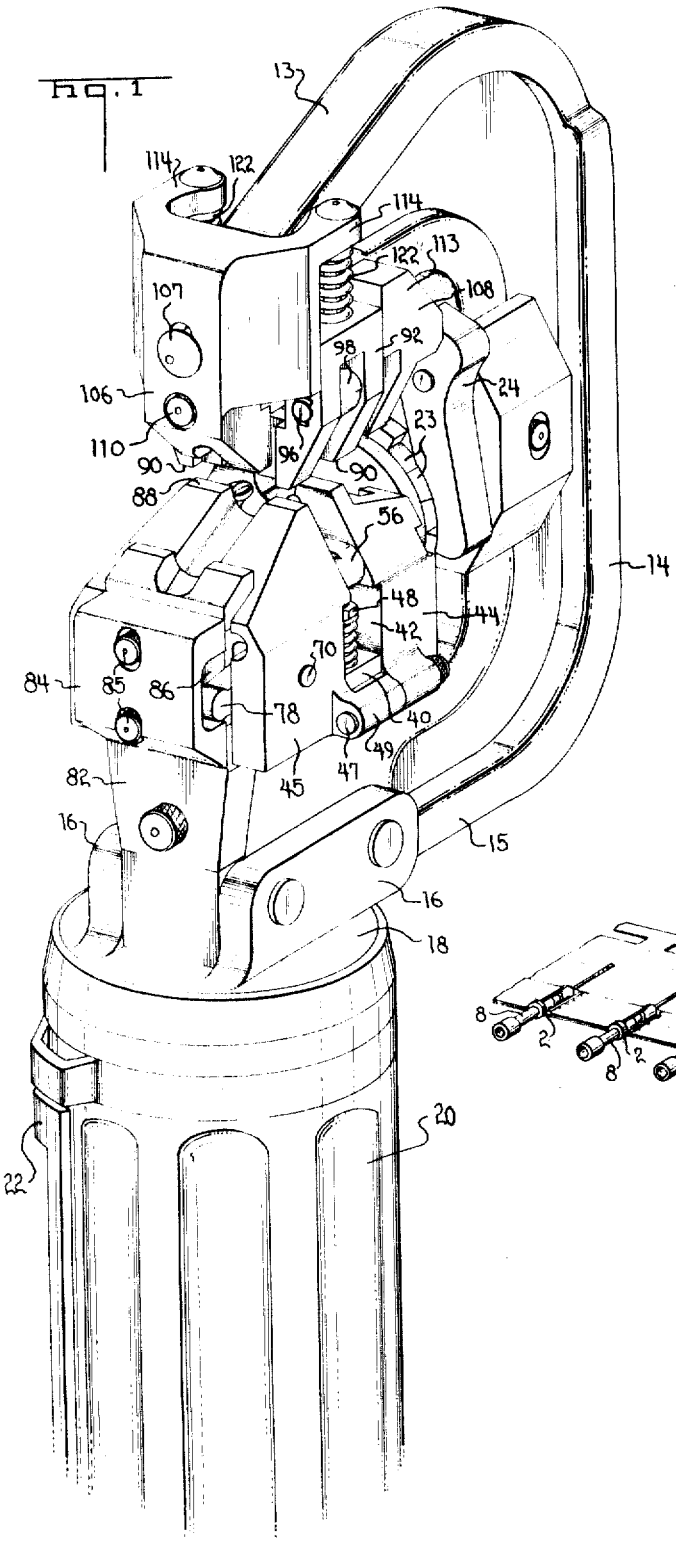
FIGURE 1 is a perspective view of a tool in accordance with a preferred embodiment of the invention.
Figure 5:
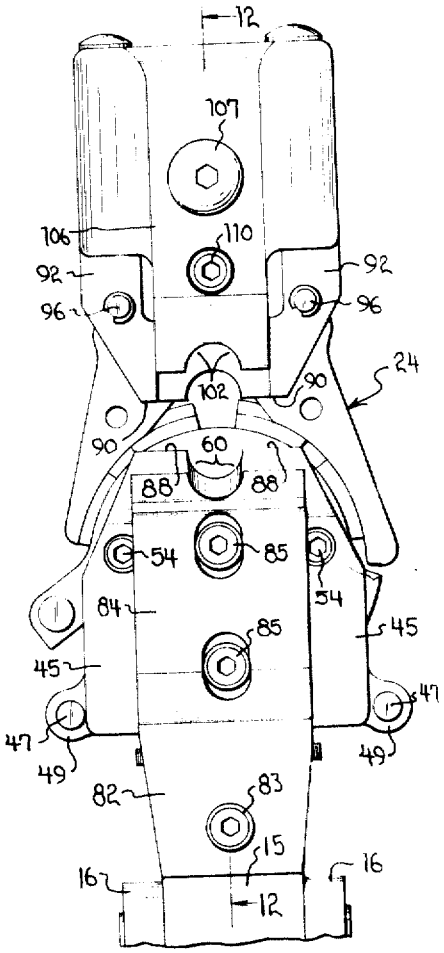
FIGURE 5 is a frontal view looking in the direction of the arrows 5—5 of FIGURE 4.
Figure 13:
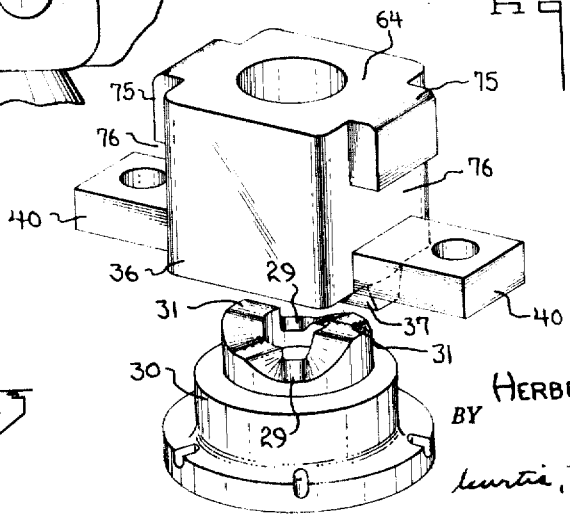
FIGURE 13 is an exploded perspective view showing the ram head member and crimp height adjusting means.

The belt supporting and feeding mechanism is indicated generally in FIGURES 1, 4 and 5 at 24. In the interest of clarity, this mechanism is shown without a section of belting thereon. For purposes of the instant disclosure, it should be noted that this mechanism comprises a dial or cylinder 23 which supports the belt. This dial is mounted coaxially with respect to a plate 25 which is intermittently rotated by a pin 26 mounted for movement with the ram 28 in a manner described below. Other details of the belt feeding mechanism are described in detail in the aforementioned Klingler et al. application, Serial No. 805,433.

A spacer 30 disposed on the upper end of ram 28 has at diametrically opposite locations on its upper side a plurality of pairs of supporting surfaces (e.g. 29, 29 and 31, 31) which are disposed at different levels with respect to the end of the ram. These supporting surfaces are adapted to support the leg 37 of a block 36 so that rotation of the spacer 30 with respect to the axis of the ram will have the effect of raising and lowering the block.

This feature of the disclosed embodiment relates particularly to the adjustment of the tool for terminals of different sizes as described below. The block 36 and the spacer are held in position by means of a pin 38 which extends through a recess in the upper surface of the block, through aligned openings in the block and spacer, and into an opening in the end of the ram to which it is held by means of a locking pin 32.

Arms 40 extend from opposite sides of the block 36 and slidably accommodate pins 46. A head 48 is provided on the upper ends of these pins and coil springs 52 are interposed between these heads and the surfaces of the arms thereby to bias the pins upwardly with respect to the block 36. The lower ends of the pins extend downwardly through the arms and through openings in the sides of one section 45 of a two-part tool holder 44, 45. Pins 46 are retained in position by means of lock washers 50 to that the springs 52 acting against the underside of the heads 48 normally bias the tool holder 44, 45 upwardly until it abuts the underside of the extensions 40. This arrangement permits relative upward movement of the ram and the block 36 with concomitant compression of the springs 52 with respect to the tool holder 44, 45.

Figure 6:
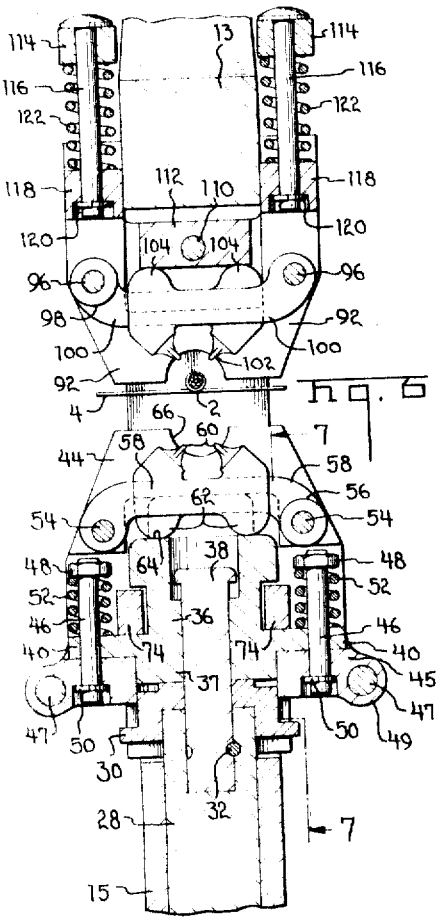
FIGURE 6 is a sectional view looking in the direction of the arrows 6—6 of FIGURE 4 and showing the positions of the parts at the beginning of a crimping operation.

As is best shown in FIGURES 1 and 4, the two parts of the tool holder 44, 45 are held together by means of screws 47 which are threaded into bosses 49 extending from the section 45. These bosses 49 function to hold the tool holder parts in spaced-apart relationship so that a slot or transverse cavity 42 remains, the block 36 being contained in this cavity. Pivot pins 54 extend across this cavity in the upper portions thereof and on each side of the upper surface of the block 36. These pins serve as pivotal mountings for arms 58 which have bosses 56 on their ends through which the pins extend. As shown in FIGURE 6, these arms are curved at their ends and adjacent to the bosses 56 and extend laterally, with respect to the tool holder, in opposite directions. Each arm has an indenter 60 on its end which is directed generally obliquely and upwardly towards a semi-circular notch 66 in the upper edges 88 of the tool holder. On the sides of the arms opposite to the indenter 66, there are provided protuberances 62 which rest upon the upper surface of the block 36 so that upon upward movement of this block relative to the tool holder, the arms are rotated about their pivotal axes 54 to drive the indenters radially into a connector as will be described below.

Figure 9:
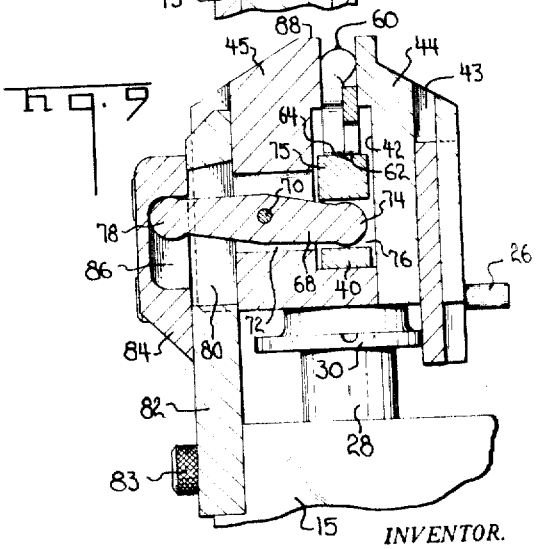
FIGURE 9 is a view taken along the lines 9—9 of FIGURE 8.
Figure 7:
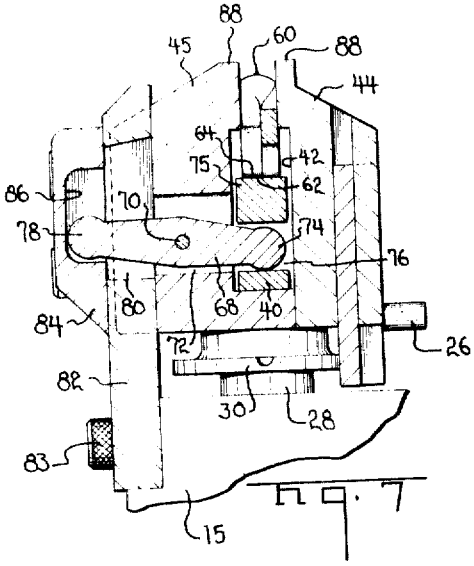
FIGURE 7 is a view taken along the lines 7—7 of FIGURE 6.
Figure 12:
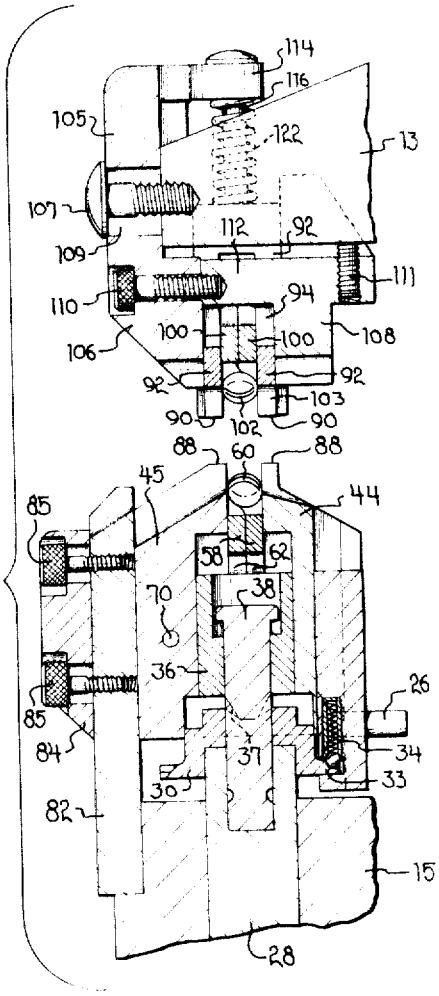
FIGURE 12 is a central sectional view taken along the lines 12—12 of FIGURE 5 and showing the central sections of the upper and lower tool holders.
Figure 11:
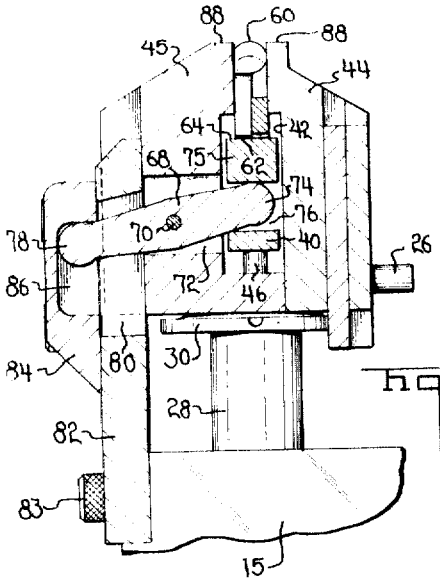
FIGURE 11 is a view taken along the lines 11—11 of FIGURE 10.

Referring now particularly to FIGURES 7, 9, and 11, the relative motion of the block 36 with respect to the tool holder 44, 45 is achieved by means of a pair of levers 68 which are mounted on pins 70 in recesses 72 in the tool holder section 45. The right hand ends of these levers, as viewed in FIGURE 11, extend into recesses 76 on the block 36 formed between ears 75 and the extensions 40. The left hand end of each lever extends through a slot 80 in a plate 82 and into a recess 86 in a block 84. The plate 82 is secured to the tool frame by means of a fastener 83 while the block 84 is adjustably secured to the plate 82 by means of fasteners 85 which extend through elongated slots in the block (FIGURE 12). This arrangement permits relative upward or downward adjustment of the block 84 for reasons which will be apparent as the description proceeds.

It will be noted that the recess 76 in the block 36 is of a size which closely approximates the size of the end of the lever so that very little movement of the lever with respect to the block is permitted. Referring now to FIGURES 7, 9 and 11, it will be apparent that as the ram 28 moves upwardly from the position of FIGURE 7 to the position of FIGURE 9, the block 36 and the tool holder 44, 45 move upwardly as a unit by virtue of the fact that these two parts are held together by the spring 52 and pin 46. Upon arrival of the ram at the position of FIGURE 9, however, the ends 78 of the levers engage the upper walls of the cavities 86 and upon further upward movement of the ram, the levers 68 must therefore pivot in a counterclockwise direction. This pivotal movement of the levers controls the subsequent upward movement of the tool holder 44, 45 and restricts its movement so that this member only moves a fraction of the distance which the ram moves, the differential in motion of the ram and tool holder being compensated by compression of the springs 52. The block 36, being directly mounted on the ram, moves the full distance that the ram moves during this interval. Thus, the upper surface 64 of the block 36 moves relative to the tool holder 44, 45 and the levers 58 are swung about their pivotal axes and driven into crimping and indenting relationship with the terminal.

The upper edges 88 of tool holder 44, 45 are adapted to engage the complementary edges 90 of an upper tool holder 92. This upper tool holder is mounted between a pair of mounting blocks 106, 108 which are adjustably secured to the upper arm 13 of the frame 14. As shown best in FIGURES 4, 5 and 11, block 106 is secured to the end of arm 13 by means of a screw 107 which extends through an oversized slot 109 in an upstanding frontal portion 105 of the block. Block 108 is secured to block 106 by means of a fastener 110 which extends through an opening in block 106 and into a threaded opening in a flange or extension 112 in block section 108. Advantageously, a set screw 111 is threaded through an opening in a rearwardly extending flange in block 108 and bears against the underside of arm 13 and a pair of ears 113 extend upwardly from this block and bear against the sides of the arm in order to stabilize this member.

Upper tool holder 92 has a transverse slot 94 across which pivot pins 96 extend at each side thereof. These pins serve as pivotal axes for bearing bosses 98 on the ends of arms 100 which extend in opposite directions across the slot and which have indenters 102 on their ends. These indenters extend towards the center of a notch 103 which is complementary to the notch 66. The sides of the arms opposite from the indenters are provided with protuberances 104 which bear against the under side 115 of the extension 112 of block 108. Upon upward movement of the upper tool holder, these arms are rotated about their pivotal axes 96 and the indenters move radially into the center of the notch.

The upper tool holder 92 is normally biased to the position of FIGURES 1 and 4 by means of springs 122 which act between flanges 114 on block 106 and the upper surfaces of arms 118 on the tool holder which fit over the sides of the upper frame arm 13. Pins 116 extend centrally through these springs and are retained in place by their enlarged heads and by lock washers 120 on their lower ends.

The pin 26, which actuates the belt feeding mechanism 24 is mounted on a plate 27 which is slidably carried on the section 44 of the lower tool holder by means of dove tails and complementary slots 43. This plate has a notch at its lower end which receives a circumferential flange 33 on the spacer 30. This arrangement permits rotation of the spacer, to raise or lower the block 36, without changing the position of the pin 26 with respect to the ram. It should be mentioned that the position of this pin should not be changed in the disclosed embodiment for the reason that its stroke must always be of the same amplitude to actuate the belt feed mechanism. Advantageously, a spring biased ball detent 34 is provided in plate 27 to prevent accidental rotation of spacer 30.

Figure 8:
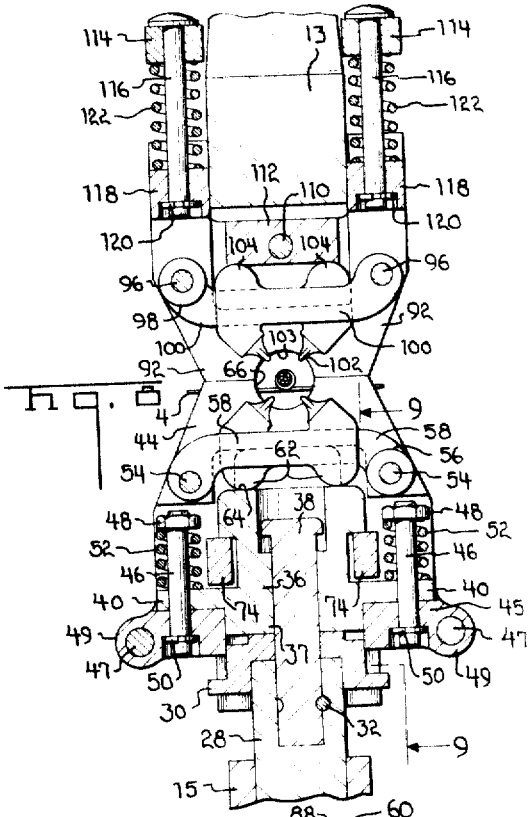
FIGURE 8 is a view similar to FIGURE 6 but showing the positions of the parts at an intermediate stage of the crimping cycle and after the tool holders have been moved into engagement with each other.
Figure 10:
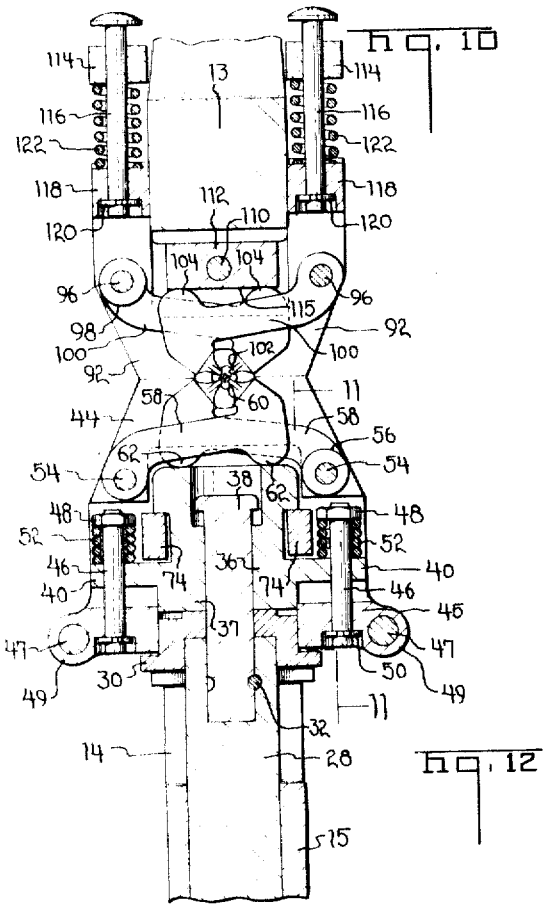
FIGURE 10 is a view similar to FIGURE 8 but showing the positions of the parts after the connector has been fully indented.

In use an uncrimped terminal will be positioned between the tool holders at the start of the cycle, this uncrimped terminal having been fed at the end of a previous operating cycle. The operator inserts the stripped end of a wire into the ferrule of this uncrimped terminal and actuates the tool by pressing the trigger 22 to drive the ram upwardly. During upward movement of the ram, the lower block 36 and the lower tool holder 44, 45 move upwardly as a unit until the edges 88, 90 come into engagement with each other. Thereafter, the upper and lower tool holders both move upwardly as a unit, however, they do not move at the speed of the ram itself but only at a fraction of the speed because of the fact that the movement of the lower tool holder, and therefore the upper tool holder, is now controlled by the levers 68. During this stage of the cycle, the four arms are rotated, the lower arms by the surface 64 of the block 36 and the upper arms by the surface of the extension 112 on the block 108, thereby to indent the terminal as shown best in FIGURES 8 and 10.

A salient advantage of the instant device is that the tool holders move completely apart so that the finished crimped connection can be moved laterally from between the tool holders and out of the C-shaped frame member. This permits the use of an indentation type crimp as a splice, for example, and, of course, permits the use of terminals in belt form as in the instant disclosure.

The disclosed embodiment of the invention can be adjusted for varying sizes of terminals in a manner which will now be explained. It should be pointed out that the indentation type crimp of FIGURE 3 is relatively critical from a dimensional standpoint and that the accurate and precise adjustment of the tool is therefore a desirable feature. The criticality of the crimp concerns both the depth of the indentations and the uniformity of the depth. The depth of these indentations is readily controlled by means of the spacer 30 which can be rotated to raise or lower the block 36. Raising the block has the effect of increasing the depth of the indentations formed by the indenters and/or adapting the tool to usage with smaller diameter terminals. This effect will be apparent if it is observed that when the block 36 is raised, by rotation of the spacer 30, the two tool holders are moved relatively towards each other so that during the stroke of the piston 28, the indenter arms start to pivot at an earlier stage of the cycle. In other words, if the block 36 is raised, the amount of relative motion between the lower tool holder and the block 36 and between the upper tool holder and the block 112 is increased and the indenting motion of the indenters is thereby increased.

The plate 84 can also be adjusted upwardly or downwardly by virtue of the oversized slots through which the screws 85 extend. Downward movement of this plate results in a deeper penetration of the ferrule by the indenters while upward movement thereof results in shallower penetration.

It is not contemplated that it will ordinarily be necessary to adjust the upper tool holder when the terminal size is changed. The elongated slot 107 permits raising or lowering of this upper tool holder but such adjustment will ordinarily be made only to compensate for the initial position of the ram 28. Thus, when the tool is initially assembled, the upper tool holder is adjusted to permit this ram to travel its full stroke but subsequent adjustments are unnecessary.

It will be noted that in the drawing, the spacer 30 is in a position such that the block 36 and the lower tool holder are in their lowest relative position of adjustment. It will also be noted that the head of pin 38 is spaced from the bottom of the counterbore in which it is located. This spacing is necessary to permit upward movement of the block 36 relative to the pin when the block is raised.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A device for radially indenting electrical connectors comprising, a pair of tool holders movable relatively towards and away from each other along a rectilinear path and movable as a unit along said path after engagement with each other, each tool holder having a pair of pivotally mounted arms normally extending towards and past each other, said arms having indenters on their ends directed towards a common point of intersection, and camming means for pivotally moving said arms, during movement of said tool holders as a unit, thereby to move said indenters radially into a connector positioned between said tool holders.

2. A device as set forth in claim 1 wherein a first one of said tool holders is yieldingly mounted on a relatively non-movable support, and a second one of said tool holders is yieldingly mounted on a reciprocable ram, said camming means being engageable with said arms during yielding of said tool holders with respect to said ram and said non-movable support.

3. A device as set forth in claim 2 including means for controlling the yielding of said second tool holder.

4. A device as set forth in claim 3 wherein said means for controlling yielding of said second tool holder comprises lever means pivotally mounted on said second tool holder and pivotally movable by said ram.

5. A device for radially indenting electrical connectors comprising, a pair of tool holders movable relatively towards and away from each other along a rectilinear path and movable as a unit along said path after engagement with each other, each tool holder having a pair of pivotally mounted arms thereon, said arms being mounted on opposite sides of each tool holder and extending obliquely towards and past each other, said arms having indentors on their ends directed towards a common point of intersection, and a camming means on each of said tool holders, each camming means being movable with respect to its tool holder after engagement of said tool holders with each other, and each camming means being in engagement with the arms of its respective tool holder thereby to swing said arms about their pivotal axis and to move said indentors radially into a connector positioned between said tool holders.

6. A device as set forth in claim 5 wherein a first one of said tool holders is yieldingly mounted on a non-movable support, and a second one of said tool holders is yieldingly mounted on a reciprocable ram, said camming means for said first tool holder being fixed to said non-movable support and said camming means for said second tool holder being non-yieldingly mounted on said ram whereby, relative movement between each of said tool holders and its respective camming means takes place when said tool holders move as a unit after engagement with each other.

7. A device for radially indenting electrical connectors comprising, a pair of tool holders, a first one of said tool holders being yieldingly mounted on a non-movable support, a second one of said tool holders being yieldingly mounted on a reciprocable ram for movement towards and away from said first tool holder, said tool holders being movable as a unit upon engagement with each other during movement of said ram, each tool holder having a pair of pivotally mounted arms thereon, said arms being mounted on opposite sides of each of said tool holders and extending obliquely towards and past each other, said arms having indentors on their ends directed towards a common point of intersection, a first camming means on said non-yielding support and a second camming means adjustably mounted on said ram for adjustment towards and away from said first camming means, each camming means being in engagement with the arms of its respective tool holder thereby to swing said arms about their pivotal axes upon movement of said tool holders as a unit with concomitant relative movement between said first tool holder and said support and said second tool holder and said ram.

8. A device for radially indenting electrical connectors comprising, a first tool holder yieldingly mounted on a support, a second tool holder yieldingly mounted on a reciprocable ram, each tool holder having a pair of pivotally mounted arms thereon extending towards and past each other, said arms having indentors on their ends directed towards a common point of intersection, located between said tool holders, said tool holders being engageable with each other and being movable as a unit after engagement with concomitant yielding of said tool holders, lever means acting between said ram and said second tool holder positively to control yielding of said second tool holder relative to said ram, and camming means engageable with said levers during yielding of said tool holders pivotally to move said arms thereby to move said indentors towards said common point and to indent a connector positioned with its axis at said common point.

*9. A device for radially indenting electrical connecting devices comprising, two pairs of indentor arms, said arms being pivotally mounted on parallel, spaced-apart axes, the arms of each pair extending towards, and past, each other, indentor means on the ends of said arms, said indentor means being directed towards a common point, and actuating means for pivotally swinging each of said arms about its pivotal axis thereby to move said indentor means towards said common point and to indent a connector positioned at said common point.*

*10. A device for radially indenting electrical connecting devices comprising, two pairs of indentor arms, the arms of each pair being pivotally mounted on parallel, spaced-apart axes, the axes of each pair defining a plane, said planes extending parallel to each other, the two arms of each pair extending towards and past each other, indentor means on the ends of said arms, and actuating means for pivotally swinging each of said arms about its pivotal axis thereby to move said indentor means towards a common point and to indent a connecting device at said common point.*

*11. A device as set forth in claim 10 wherein said actuating means comprises means movable against each of said arms.*

*12. A device as set forth in claim 10 wherein said actuating means comprises two force-applying means, each of said force-applying means being movable against the arms of one of said pair of arms.*

References Cited by the Examiner

The following references, cited by the Examiner, are of record in the patented file of this patent or the original patent.

UNITED STATES PATENTS

| | | | |
|---|---|---|---|
| 313,969 | 3/1885 | Urbahn | 72—399 |
| 1,937,878 | 12/1933 | Encsley | 72—399 |
| 2,256,457 | 9/1941 | Douglas | 72—399 |
| 2,761,486 | 9/1956 | Reardon. | |
| 2,921,618 | 1/1960 | Fuller. | |
| 3,111,157 | 11/1963 | Henry | 72—402 |

CHARLES W. LANHAM, *Primary Examiner.*

R. D. GREFE, *Assistant Examiner.*